R. E. HELLMUND.
PHASE CONVERTING SYSTEM.
APPLICATION FILED MAR. 13, 1916.
1,318,752.
Patented Oct. 14, 1919.
2 SHEETS—SHEET 1.
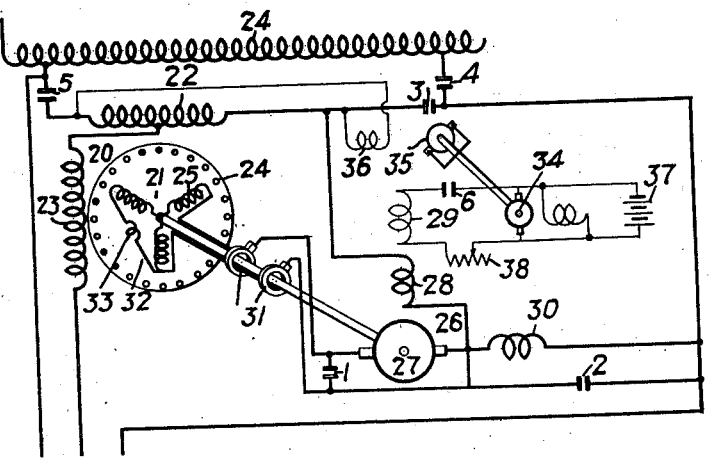
Fig. 1.
Fig. 2.
Fig. 3.
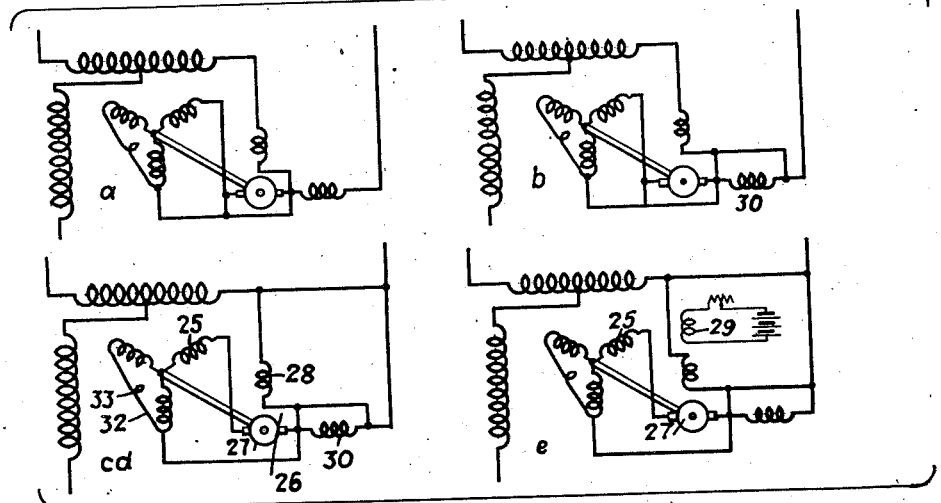
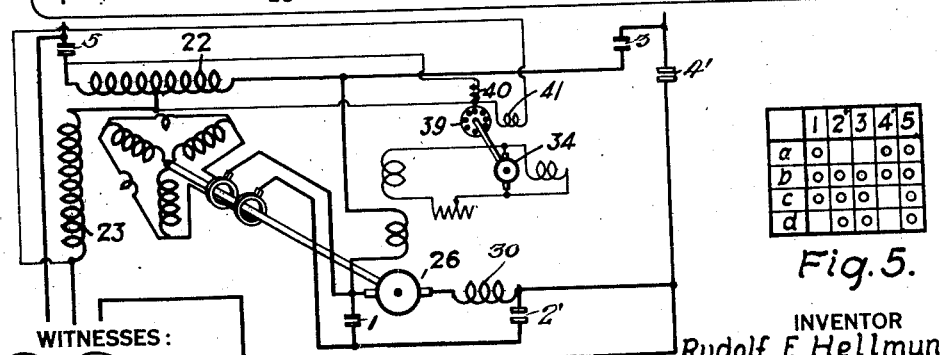
Fig. 4.
Fig. 5.
WITNESSES:
INVENTOR
Rudolf E. Hellmund.
BY
ATTORNEY

R. E. HELLMUND.
PHASE CONVERTING SYSTEM.
APPLICATION FILED MAR. 13, 1916.

1,318,752.

Patented Oct. 14, 1919.
2 SHEETS—SHEET 2.

WITNESSES:
R.J.Redge.
D.C.Davis.

INVENTOR
Rudolf E. Hellmund
BY
Wesley G. Carr
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

PHASE-CONVERTING SYSTEM.

1,318,752.     Specification of Letters Patent.     Patented Oct. 14, 1919.

Application filed March 13, 1916. Serial No. 83,776.

*To all whom it may concern:*

Be it known that I, RUDOLF E. HELLMUND, a subject of the Emperor of Germany, and a resident of Pittsburgh, in the county of Allegheny and State of Pennsylvania, have invented a new and useful Improvement in Phase-Converting Systems, of which the following is a specification.

My invention relates to phase-converting systems of the type wherein a dynamo-electric machine embodying quadrature-related primary and secondary stator windings and with a coil-type rotor winding is employed for phase conversion, and it has for its object to provide means whereby a machine of the character designated may be started and smoothly accelerated to synchronous speed with but little current drain and other disturbance of the supply system and whereby, when said phase converter is brought to substantially synchronous speed, direct current may be supplied to the rotor thereof for synchronous operation and power-factor adjustment.

A further object of my invention is to provide means whereby, upon cessation of power in the supply circuit, said direct exciting current is discontinued, and resultant harm to the exciting apparatus and phase converter is prevented.

Still further objects of my invention will be hereinafter more fully pointed out.

Figure 6:
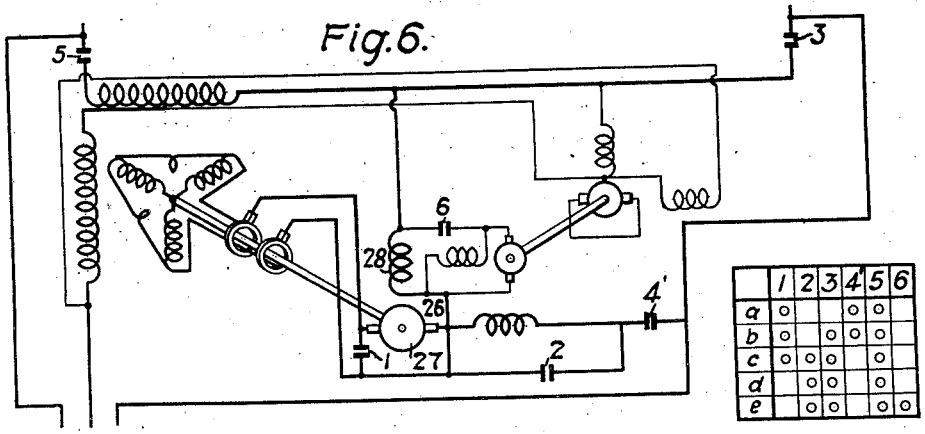
Figure 7:
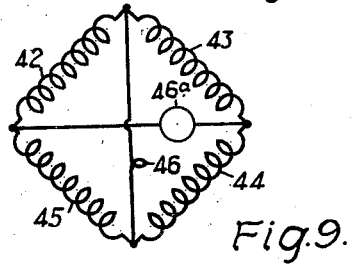
Figures 8, 9:
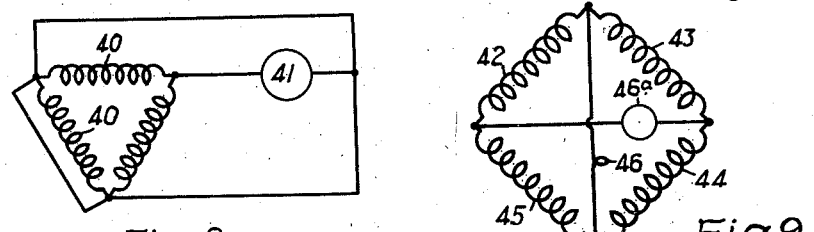
Figure 10:
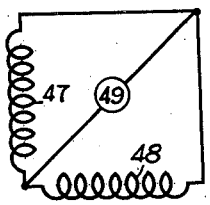

In the accompanying drawing, Figure 1 is a diagrammatic view of a phase converter of the character designated, together with its attendant supply, control and excitation circuits, illustrating a preferred form of my invention; Fig. 2 is a sequence chart setting forth the order of switch operation in the system of Fig. 1; Fig. 3 is a group of simplified diagrammatic views illustrating the steps in the development of the circuit in Fig. 1 when the switches thereof are manipulated in accordance with the chart of Fig. 2; Figs. 4 and 6 are diagrammatic views of modifications of the system shown in Fig. 3; Figs. 5 and 7 are sequence charts showing the order of switch operation in the system of Figs. 4 and 6, respectively, and Figs. 8, 9 and 10 are simplified diagrammatic views, showing the method of employing an exciting machine in connection with rotors provided with delta connected or with two-phase windings.

In the operation of railway vehicles provided with propulsion motors of the polyphase induction type and deriving propulsive energy from a single-phase, alternating-current trolley, it is customary to provide phase converters of the induction type for conversion of the single-phase supply energy into the polyphase energy desired for the propulsion motors. It has furthermore been proposed to supply direct-current excitation to the rotors of phase converters of the character designated in order that the same may be caused to run at synchronous speed in order to enable power-factor compensation to be obtained.

All phase converters of the general character designated being, in their essence, single-phase induction motors, they are not self-starting and it is therefore necessary to provide a starting motor therefor, machines of the commutator type commonly being employed for this purpose since machines of this character may be readily started by means of single-phase currents. In a copending application of Stanley G. Nottage, Serial No. 70,408, filed Jan. 5, 1916, and assigned to the Westinghouse Electric & Manufacturing Company, is disclosed a system for starting phase converters by means of a commutator motor, the starting motor being connected in series with a winding of the phase converter at the start in order to cut down the current drain upon the supply system which would be occasioned by the lack of back-electromotive force in the phase converter winding were said winding connected directly to said source. In a system of this character, as the phase converter comes up to speed, its back-electromotive force absorbs more and more of the electromotive force of the source and, hence, the voltage available for the starting motor is gradually reduced and said motor may be short circuited and removed, if desired, with but little difficulty.

In my copending application, Serial No. 64,673, filed Dec. 2, 1915, I disclose and claim a phase converter system wherein the brunt of the load current in the rotor of the phase converter is carried by a squirrel-cage winding but wherein definite poles are established on the phase converter rotor by a direct-current winding to cause synchronous operation in order to render power-factor compensation possible. In the system of said application, said direct-current excitation is produced by a distinct exciting machine and, in addition thereto, I employ a starting motor of the alternating-current type for first bringing the phase converter up to synchronous speed.

In the present invention, I mechanically and electrically associate a dynamo-electric machine of the compensated, commutator type with a phase converter and I first employ said auxiliary machine as a starting motor connected in series with a rotor winding of said phase converter for a starting operation somewhat analagous to that of the aforementioned Nottage application and I subsequently cause said auxiliary machine to operate as a direct-current generator and to supply unidirectional exciting current to said phase converter for synchronous operation in the manner set forth in my aforementioned application. A phase converter embodying my invention may or may not be provided with a squirrel-cage winding in addition to a coil winding and, furthermore, is preferably provided with means for de-energizing said main-current exciting means upon a supply of voltage and for maintaining a balance in the phases of the phase converter rotor where the latter is of the polyphase type.

Referring to the accompanying drawings for a more detailed understanding of my invention, I show a phase converter at 20, said machine embodying a rotor 21, primary stator winding 22 and secondary stator winding 23 in quadrature relation thereto. The primary winding 22 may be connected to any suitable source of alternating current 24 by means of suitable switches 4 and 5. The rotor 21 is provided with a squirrel-cage winding 24 and with a star-connected coil winding 25, the latter being preferably of considerable current-carrying capacity. An auxiliary machine 26, preferably of the commutator type, is associated with the phase converter 21 and is provided with an armature 27, exciting field windings 28 and 29 and a compensating-field winding 30. The armature 27 is shown as mounted upon the same shaft with the rotor 21 of the phase converter 20 for starting the same, although said two machines may be otherwise mechanically connected, as through gearing or belting, if desired. The closure of a switch 3 short circuits said field windings 28 and 30 and connects the primary stator winding 22 directly across said source and, in addition thereto, the compensating-field winding 30 may be directly short-circuited by the closure of a switch 2. The armature 27 may likewise be short-circuited by closing a switch 1. One phase of the star winding 25 is opened, the terminals thereof connected to suitable slip rings 31 on the shaft of the phase converter, and said slip rings connected across the brushes of the armature 27 for a purpose to be hereinafter more fully pointed out. Another phase of the rotor winding 25 is closed through a connection 32, preferably embodying a slightly inductive device 33. The main field winding 29 of the machine 26 is connected across the terminals of a direct-current generator 34 which is driven by any suitable means, such, for example, as a repulsion motor 35, the stator winding 36 of which is connected across the terminals of the stator primary winding 22. A battery 37 is preferably floated across the generator 34 and said battery and generator may well be those commonly provided for operating the lights, controller and other devices on the railway vehicle. The motor 35 may likewise be employed to drive the fan commonly installed for ventilating and cooling purposes.

Having thus described a system embodying my invention, the operation is as follows: at the outset, the switches 1, 4 and 5 are closed, whereupon the windings 22, 28 and 30 are connected in series across a portion of the source 24, and the armature 27 is short circuited. As a result, the motor 26 starts as a conductively compensated repulsion motor with good starting torque and commutation and brings the rotor 21 up to substantially synchronous speed, all as indicated in Fig. 3$^a$. The inclusion of the windings 28 and 30 in circuit prevents the flow of abnormally large currents in the winding 22 which would otherwise be permitted because of the absence of back-electromotive force in the machine 20. As described in connection with the aforementioned Nottage application, the approach of the machine 20 to synchronous speed produces a back-electromotive force in the winding 22 which absorbs a greater and greater portion of the voltage of the source 24 whereby the voltage across the field windings is gradually reduced and said motor becomes less and less effective in the starting operation. When substantially synchronous speed is obtained, the switch 2 is closed, short circuiting the compensating-field winding 30 and changing the machine 6 from conductive to inductive compensation, likewise raising the voltage on the stator 22, all as indicated in Fig. 3$^b$. The switch 1 is next opened and the switch 3 closed, short-circuiting the exciting field winding 28 and connecting the armature 27 across its associated phase of the rotor winding 25. As a result, the machine 26 loses its torque, and the slip-frequency alternating current of a portion of the winding 25 circulates through the armature 27. The machine 26 is preferably provided with a laminated field structure throughout, and the compensating field winding 30 is preferably distributed. Said compensating field winding being short circuited, there results a very close compensation for the reactance of the armature 27.

This fact, coupled with the low frequency of said circulating currents, results in but little opposition to the flow of such currents through the armature 27. The phase connection 32, however, is preferably provided with a slightly inductive device 33 in order to produce balance in the rotor winding. Finally, the switch 6 is closed, energizing the exciting field winding 29 and producing a unidirectional exciting field in the armature 27. Said armature 27 is driven by the phase converter rotor 21 and, thereupon, generates a unidirectional electromotive force which produces a circulation of direct current in the associated phase of the rotor winding 25, said direct-current flow being superposed for the time being upon the slip-frequency alternating currents circulating in said rotor winding. Said exciting field excitation from the winding 29 builds up very slowly because the exciting field winding 28 is short circuited and hence damps out abrupt flux changes therein and, as a result, the electromotive force of the armature 27 builds up quite slowly, thus causing the definite poles on the rotor 21 to slowly develop and permitting the latter to seek and maintain a synchronous-speed position with respect to its stator field without abrupt changes in position such as would tend to cause disturbance of the operation. After synchronous operation of the rotor 21 has been attained, the currents circulating in the rotor winding thereof are unidirectional. If it be desired to adjust the power factor of the system, this effect may be produced either by over-excitation or under-excitation of the winding 25 by varying the excitation of the winding 29 at a suitable rheostat 38.

At all times when the armature winding of the machine 26 is in circuit with the phase-converter, it is desirable that the inductive reactance thereof be maintained at a minimum in order to prevent harmful effects upon the power-factor. To this end, the compensating field winding 30 should be distributed, so that accurate compensation may be obtained at all points across the armature.

When employing a phase converter rotor provided with squirrel-cage and coil windings, as shown, the coil winding may be open circuited during the starting operation, as by lifting the brushes at 31, in order to obtain the effect of a high resistance rotor.

The system of Fig. 4 is, in its general aspects, similar to that of Fig. 1, the only differences being in the starting motor and in the auxiliary exciting machine. The starting motor 26 starts as a series motor and has a series-connected compensating field winding when operating as an exciter machine. The small auxiliary exciting generator 34 is driven by a two-phase induction motor 39, one stator winding 40 of which is connected across a portion of the main primary stator winding 22 and the other field winding 41 of which is connected across the secondary stator winding 23. During normal operation, therefore, when there is a temporary interruption of the power on the system, the phase-converter rotor drops out of step, deënergizing the generating winding 23 and, hence, causing the stoppage of the motor 39. As a result, the excitation of the machine 26 is eliminated and no more direct current is supplied to the rotor 21 until the prescribed starting operation has been repeated.

In the system of Fig. 6, the combined starting motor and generator 26 is provided with but a single exciting field winding 28 and, by the manipulation of suitable switches, as shown in the sequence chart of Fig. 7, said exciting field winding is supplied with alternating current for the production of an alternating exciting field during the starting operation and is provided with direct current for the production of a unidirectional exciting field during generator or exciter operation.

Fig. 8 shows a method of connecting an exciter machine in connection with a delta-wound phase converter rotor, the rotor winding being shown at 40—40 and the armature of the exciter machine at 41. In like manner, Figs. 9 and 10 show, diagrammatically, methods of connecting an exciter machine to a phase-converter winding of the two-phase type. In the system of Fig. 9, the four-phase windings 42, 43, 44 and 45 are connected in rectangular or bridge formation and one pair of diagonally opposite corners are connected together, preferably through a slightly inductive device 46, and the remaining diagonally opposite corners are connected together through the armature of the exciter machine 46ª. In the system of Fig. 10, the phase-converter rotor winding consists of two parts 47 and 48 in quadrature relation to one another and the ends of said windings are connected together as shown, the exciter machine 49 being in circuit between said end connections.

While I have shown my invention in several of its preferred forms, it will be obvious to those skilled in the art that it is susceptible of various minor changes and modifications without departing from the spirit thereof, and I desire, therefore, that only such limitations shall be placed thereupon as are imposed by the prior art or are indicated in the appended claims.

I claim as my invention:

1. The combination with a phase-converting dynamo-electric machine provided with primary and secondary stator phase windings and with a wound rotor member, of an auxiliary dynamo-electric machine of the commutator type, means for mechanically coupling the rotor of said auxiliary machine to the rotor of said phase-converter, means for electrically connecting said auxiliary machine in series relation with a portion of the rotor winding of said phase-converter, means for starting said phase converter comprising a source of alternating current and means for connecting said rotor winding across said source in series with a portion of the windings of said auxiliary machine, and means for energizing the exciting field of said auxiliary machine with unidirectional current after said phase-converter has reached substantially synchronous speed, whereby direct current is supplied to the rotor thereof from said auxiliary machine and synchronous operation is obtained.

2. The combination with a phase-converting dynamo-electric machine provided with primary and secondary stator phase windings and with a wound rotor member, of an auxiliary dynamo-electric machine of the commutator type, means for mechanically coupling the rotor of said auxiliary machine to the rotor of said phase converter, means for electrically connecting said auxiliary machine in series relation with a portion of the rotor winding of said phase converter, means for starting said phase converter comprising a source of alternating current and means for connecting said rotor winding across said source in series with a portion of the windings of said auxiliary machine, and means for energizing the exciting field of said auxiliary machine by unidirectional current after said phase-converter has reached substantially synchronous speed, whereby direct current is supplied to the rotor thereof from said auxiliary machine and synchronous operation is obtained, said auxiliary machine being provided with a distributed compensating winding and with means for short-circuiting said compensating winding during synchronous operation of said phase converter, whereby the inductance of the armature of said auxiliary machine is maintained at a low value.

3. The method of operating a phase-converting dynamo-electric machine provided with primary and secondary stator windings and with a wound rotor member, said machine being mechanically coupled to an auxiliary dynamo-electric machine of the commutator type and having its rotor winding connected to the armature terminals of said auxiliary machine, which comprises starting said machines in series relation from a source of alternating current and subsequently exciting said auxiliary machine by direct current, whereby direct current is generated by the latter and supplied to the rotor of said phase converter for synchronous operation thereof.

4. The combination with a phase converter provided with a stator winding and with rotor windings, of an auxiliary dynamo-electric machine, means for establishing an electrical energy-transferring connection between said auxiliary dynamo-electric machine and one only of the converter members during starting, and means for establishing a similar connection to solely the other converter member during running.

5. The combination with a phase-converting dynamo-electric machine provided with primary and secondary phase windings and with a wound rotor, of an auxiliary exciting machine mechanically and electrically connected thereto, and provided with an exciting field winding, means for energizing said exciting field by direct current during normal operation, and means for discontinuing said direct current excitation if the main supply of alternating current to said phase-converter is interrupted.

In testimony whereof, I have hereunto subscribed my name this 29th day of Feb., 1916.

RUDOLF E. HELLMUND.